(12) United States Patent
Golos et al.

(10) Patent No.: US 8,719,310 B2
(45) Date of Patent: May 6, 2014

(54) SYSTEMS AND METHODS FOR PREVENTING DATA COLLISIONS IN MULTIPLE ACCESS POSTAL SYSTEM DATA STORAGE SYSTEMS

(75) Inventors: Vladimir Golos, Shelton, CT (US); George M. Macdonald, New Canaan, CT (US)

(73) Assignee: Pitney Bowes Inc., Stamford, CT (US)

( * ) Notice: Subject to any disclaimer, the term of this patent is extended or adjusted under 35 U.S.C. 154(b) by 622 days.

(21) Appl. No.: 12/982,973

(22) Filed: Dec. 31, 2010

(65) Prior Publication Data

US 2012/0203737 A1    Aug. 9, 2012

(51) Int. Cl.
*G06F 7/00* (2006.01)
*G06F 17/30* (2006.01)

(52) U.S. Cl.
USPC ........................................... 707/802

(58) Field of Classification Search
None
See application file for complete search history.

(56) References Cited

U.S. PATENT DOCUMENTS

| | | | |
|---|---|---|---|
| 2007/0299684 A1* | 12/2007 | Goodwin | 705/1 |
| 2008/0114733 A1 | 5/2008 | Friesenhahn et al. | |
| 2009/0204782 A1* | 8/2009 | Barbarek et al. | 711/173 |
| 2011/0026704 A1* | 2/2011 | Connelly et al. | 379/219 |

FOREIGN PATENT DOCUMENTS

WO       20070047180 A2    4/2007

OTHER PUBLICATIONS

European Search Report: EP application# 11195184.4-1527, search completion date: May 4, 2012.

\* cited by examiner

*Primary Examiner* — Usmaan Saeed
*Assistant Examiner* — Michele Choi
(74) *Attorney, Agent, or Firm* — Brian A. Lemm; Charles R. Malandra, Jr.; Steven J. Shapiro

(57) ABSTRACT

An illustrative data structure is provided using a structured table that uses a split primary key including a first key, referred to as a partition key, and a second key, referred to as a row key, along with a timestamp key, but that does not otherwise utilize uniform columns that can be used as a key. The partition key that is utilized is unusually fine in that it consists of an individual user identifier that is unique to the system and/or across multiple systems used in an enterprise. Additionally, the system can limit access to one session per individual partition key.

7 Claims, 3 Drawing Sheets

| Partition Key | Row Key | Time Stamp | Name,value Pair1 | Name,value Pair2 | Name,value Pair3 | Name,value Pair4 |
|---|---|---|---|---|---|---|
| 00001 | Xxxx1 | Last | x-type, 1 | Postage, 10 | Class, 1 | ... |
| 00001 | Xxxx2 | Last | x-type, 2 | Weight, 5 | Length, 3 | ... |
| ... | ... | ... | ... | ... | ... | ... |
| 00002 | Xxxxy | Last | x-type, 3 | Carrier, 1 | Insure, 100 | ... |

FIG. 2

SYSTEMS AND METHODS FOR PREVENTING DATA COLLISIONS IN MULTIPLE ACCESS POSTAL SYSTEM DATA STORAGE SYSTEMS

BACKGROUND

The illustrative embodiments described in the present application are useful in systems including those for preventing data collisions in multiple access data storage systems and more particularly are useful in systems for preventing data collisions using structured Cloud table storage systems that do not use uniform columns. In certain embodiments, Cloud computing instances are utilized to ensure single session compliance to prevent data collisions in associated Cloud storage instances.

A typical relational database management system uses tables having rows and uniform columns to store data. Typically, each row contains a record and each column is defined to contain the same field type (a type of data) for each or the respective rows in the table. Each row of a table must include a "primary key" that is unique in the table to the particular row. For example, if a customer number is used as the primary key, each customer is allowed only one row or record in the table.

SQL and other relational databases typically provide data-processing capabilities on top of a storage system. Generally, RDBMS users desire sophisticated data processing capability in the database environment that is not typically available with databases that provide only raw storage and retrieval of data. The RDBMS can process data intensive queries without burdening the main application. Unfortunately, in a multiple-client access relational database, the whole table, or at least a page of a table, must be locked each time a row in the table is updated. Moreover, the RDBMS database will be subject to practical limitation on concurrent user access. In a large scale RDBMS system with thousands of concurrent users, database multiple user access contention and database lock contention are significant bottlenecks and performance concerns.

Two methods that have been used to attempt to address the database lock contention bottleneck issue are the use of Table Partitioning and the use of Federated Tables. However, such approaches add programming complexity and may not scale well. Moreover, traditional RDBMS partition keys use a range, list or hash based approach to vertical or horizontal partitioning of tables at a relatively course scale. Traditional RDBMS load balancing systems must still deal with access contentions. Accordingly, there is a need for a data storage type, system and method that accommodates large scale concurrent access data storage without suffering the database lock contention bottleneck described above.

SUMMARY

The present application describes illustrative data structures, methods and systems for preventing data collisions in databases.

In one illustrative embodiment, a data structure is provided using a structured table that uses a split primary key including a first key (partition key) and a second key (row key) along with a timestamp key, but that does not otherwise utilize uniform columns that could be used as a key. The partition key that is utilized is unusually fine in that it consists of an individual user identifier that is unique to the system and/or across multiple systems used in an enterprise. Similarly, an individual device identifier or combination of device identifier and user identifier may be utilized as a fine partition key. A user identifier may consist of a customer number and a device identifier may consist of an MAC address (e.g., ETHERNET) or other unique serial number. In such a way, a relatively large number of partitions are defined that reduce availability contention and locking contention in a database having a large number of concurrent users. In another example, a row key that is unique across the database is used to provide a unique transaction identifier.

In another illustrative embodiment, a Cloud data processing system is described for providing for storing and processing data structures comprising structured tables that use a split primary key including a first key (partition key) and a second key (row key) along with a timestamp key, but that do not otherwise utilize uniform columns that could be used as a key. In another example, a Cloud computing instance collocated in the same affinity group of a related storage instance provides session control and manages database operations to ensure that only one thread is concurrently requesting database operations using a particular partition key.

In yet another illustrative embodiment, a method for operating a Cloud data processing system is described for storing and processing data structures comprising structured tables that use a split primary key including a first key (partition key) and a second key (row key) along with a timestamp key, but that do not otherwise utilize uniform columns that could be used as a key. In another example, the method operates a Cloud computing instance collocated in the same affinity group of a related storage instance provides session control and manages database operations to ensure that only one thread is concurrently requesting database operations using a particular partition key.

Several additional alternatives are disclosed and described herein.

BRIEF DESCRIPTION OF THE DRAWINGS

FIG. 2 is a schematic diagram representation of a data structure according to an illustrative embodiment of the present application.

DETAILED DESCRIPTION OF EMBODIMENTS

Figure 1:
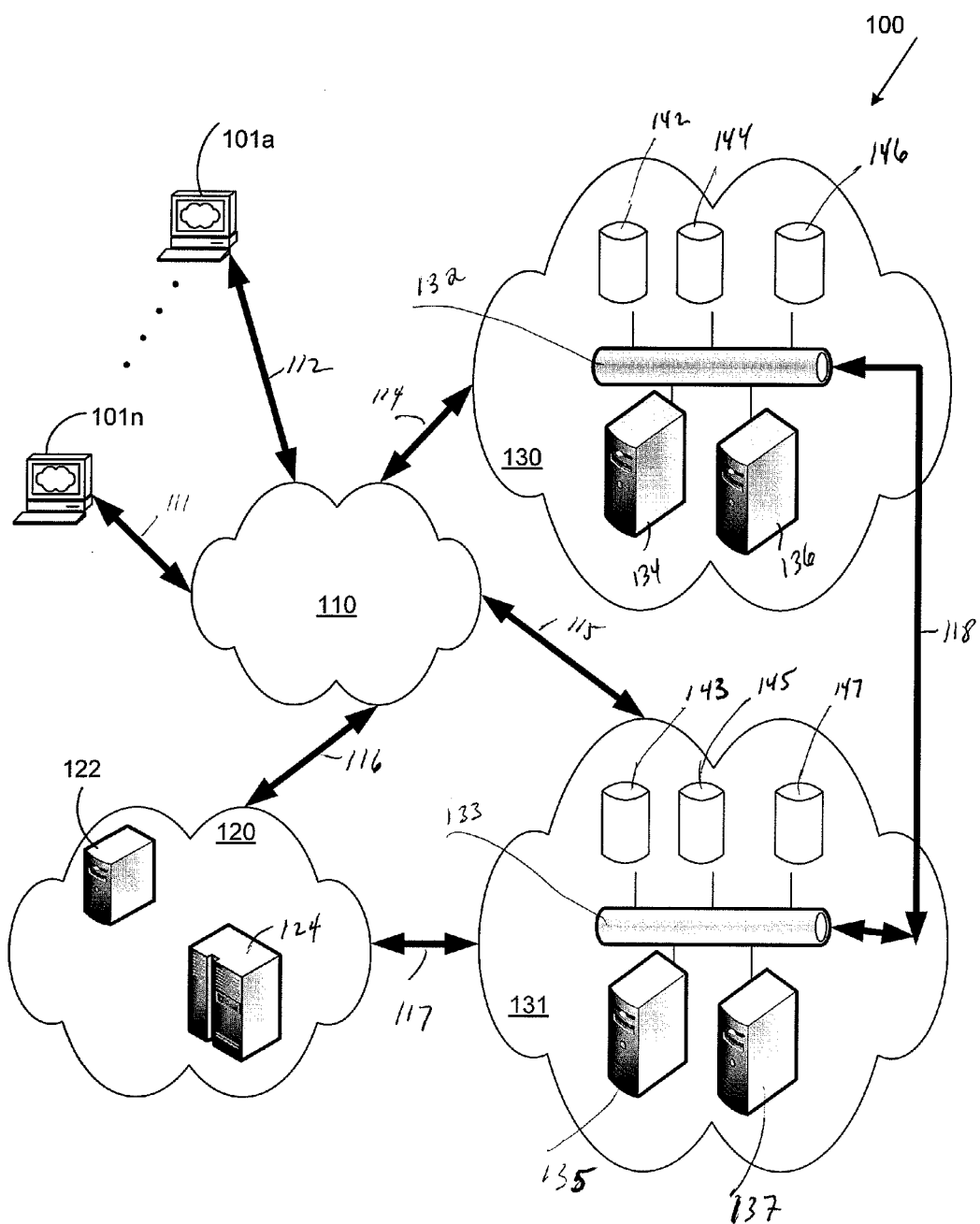
FIG. 1 is a schematic representation of a data processing system according to an illustrative embodiment of the present application.

Several client-server application hosting paradigms have been used for hosting the server side of an application. For example, a company may host its own computing servers by operating traditional computing servers that may host a relational database on a non-shared basis. Such systems may also employ load balancing, geographical balancing and/or redundancy systems. Moreover, traditional hosting providers have offered such hosting services for their customers on a dedicated equipment basis. Traditional hosting providers have also offered hosting on shared resources and offered virtualized hosting and utility computing available on demand. Cloud computing systems now offer even more virtualization.

Several companies market Cloud computing services including Amazon, Rackspace, Salesforce, Microsoft and Google. Such Cloud systems typically offer an Application Program Interface (API) specification for computing and storage instances and are typically marketed in terms of Quality of Service (QoS) levels and Service Level Agreements.

However, the providers do not necessarily expose the inner workings of the system architecture and hardware components to customers.

In the illustrative embodiments described herein, the MICROSOFT AZURE system will be used to illustrate the system. However, other Cloud and non-Cloud based storage systems may be utilized. Additionally, the illustrative example is a company's Cloud postage application hosted in a Cloud environment that has many individual concurrent users that each process a plurality of varied postage related transactions associated with records that are stored in a single Cloud Table. The varied postage transaction records are stored in rows or elements that include a first key (partition key) and a second key (row key) along with a timestamp key, but that does not otherwise utilize uniform columns that could be used as a key. The non-uniform columns consist of value, data pairs and each entity or row may have a different number of value data pair elements as required for a particular record type. In each entity or row associated with a particular user, such entity includes the same first key (partition key) that has a unique one-to-one relationship with the user for the postage application such as a user identifier. In another alternative, the user identifier is globally unique across multiple applications hosted by the company.

In the MICROSOFT AZURE Cloud computing system, Computing Instances execute application logic for the client company. Similarly, Storage Instances store data for the client company. One Storage Instance available is a relational database named AZURE SQL. Additionally, the system includes another Storage Instance that provides a non-RDBMS structured storage solution known as AZURE TABLE.

Traditionally, postage meters were used in the United States to provide convenient postal funds evidencing and accounting so that a user may conveniently pay for postage for a relatively large number of mail pieces. More recently, online postage systems have been used to process postage transactions. Several such systems are described in U.S. Pat. No. 6,619,544, U.S. Pat. No. 7,353,213, U.S. Patent Application Publication No. 2005-0065897 A1, Patent Application Publication No. 2003-0088518A1 and U.S. Patent Application Publication No. 2005-0138469 A1, all incorporated herein by reference in their entirety. The United States Postal Service published a draft specification entitled Performance Criteria for Information-Based Indicia and Security Architecture for Open IBI Postage Evidencing Systems (PCIBI-O), dated Feb. 23, 2000.

Only a small illustrative subset of the types of records and data fields stored in the system are described herein. In practice, several postage transaction record types are implemented, each associated with a postage related transaction and having appropriate name, data pairs for the record. Each postage customer in the system described herein is a user provided with an account and a user identifier that is unique in the system.

Referring to FIG. 1, a system schematic diagram of a data processing system 100 according to an illustrative embodiment of the present application is described. In this illustrative embodiment, the application described is a large, multiple concurrent user postage payment and processing application. Such a system may have tens of thousands or more concurrent users. Additionally, the database described stores postage processing related transaction records.

An illustrative online postage vendor maintains a network 120 including an online postage system 122 and other applications 124. The online postage vendor hosts a portion of the online postage system using a Cloud Computing provider having Cloud systems 130, 131. The online postage system services many thousand concurrent users 101a-101n who each access the system using client systems such as web browser enabled devices connected to one or more large public networks such as the Internet 110 using access provider communications channels 112, 111, respectively. The online postage company network 120 is also connected to the Internet 110 using communications channel 116. The online postage company network 120 may also be connected directly to the Cloud Computing provider system 131 using channel 117. The Cloud Computing provider system 131 is connected to the Internet 110 using communications channel 115 and directly to Cloud Computing provider system 130 using communications channel 115, where system 130 may be geographically remote to system 131. Cloud Computing provider system 130 is also connected to the Internet 110 using communications channel 114. The schematic is illustrative and a typical configuration would include several Cloud Computing provider systems 130, 131 and multiple servers 122 having geographical load balancing, volume load balancing and redundancy systems. For example, servers 122 may include a CLICK STAMP ONLINE server.

The Cloud Computing provider publishes an API for data storage such as in the MICROSOFT AZURE system that includes account access to data storage instances including the AZURE SQL system, the non-RDBMS structured storage solution known as AZURE TABLE and AZURE BLOB storage. Here, the Cloud Computing provider system 131 includes an internal network 132 such as ETHERNET or INFINIBAND connecting Computing and Storage instances. The AZURE TABLE storage instance is represented across storage device nodes 143, 145, 147 with most of the innerworkings of the storage hidden from the online postage client vendor.

The storage system achieves good scalability by distributing the partitions across many storage nodes. The system monitors the usage patterns of the partitions, and automatically balances these partitions across all the storage nodes. This allows the system to scale to meet the traffic needs of your table. That is, if there is a lot of traffic to some partitions, the system will automatically spread them out to many storage nodes, so that the traffic load will be spread across many servers. The amount of data stored within a partition is not limited by the storage capacity of one storage node.

Similarly, servers 135, 137 are used to provide Computing Instances in a type of virtualized environment. If a Computing Instance is in an affinity group with a database, it will be served from the same location such as network 131. In an AZURE TABLE, all entities or rows having the same partition key will be served by a single storage node.

Additionally, Cloud Computing provider system 130 includes an internal network 132 such as ETHERNET or INFINIBAND connecting Computing and Storage instances. The AZURE TABLE storage instance is represented across storage device nodes 142, 144, 146 with most of the innerworkings of the storage hidden from the online postage client vendor. Similarly, servers 134, 136 are used to provide Computing Instances in a type of virtualized environment.

Instead of using the common course partition key such as the resident state of a user as is often recommended, this system uses a very fine partition key that is counter-intuitive to and that contradicts the stated purpose of a partition key. However, it has been learned that using such fine partition key at a unique user level provides several advantages that improve access contention and lock contention performance.

Additionally, in another example, the Computing Instance running on servers 135, 137 associated with the AZURE TABLE is used to ensure that only one session of a particular partition key is active at any one time. For example, if the partition key is a user identifier, only one session having that user identifier will run on that Cloud application at a time. In that scenario, multiple sessions for a particular device would be allowed. Additionally, if a device MAC address or other identifier is used as the partition key, then only one session for that identifier is permitted at a time, while more than one user session would be permitted. A timeout may be used to ensure that inactive sessions or stuck sessions are purged from the system to avoid locking the resources. For example a timeout of 5 minutes without activity may be used.

The online postage vendor postage system 122 includes one or more servers that execute business logic and storage to provide an online postage product web services functionality including product usage rules and validation. The system provides postage related functions including obtaining and providing postal labels and indicia, obtaining and providing postal rates and address cleansing, providing for carrier pickup notifications, providing for package tracking and providing insurance and other postal related functions. The enterprise system servers 124 are one or more servers that provide enterprise application support such as a common enterprise customer account login. Using an enterprise login, the system can ensure that a user identifier is unique across applications on the enterprise system. The enterprise servers 124 may provide customer account, product and funds management services to the system. The enterprise servers 124 may provide account creation and management along with the login services. An active directory may be used for authentication and a ping identity may be used to provide single sign-on services. The single sign-on services may also be used with the Cloud Computing instances to ensure that only one user session is permitted at a time, or that only one device session is permitted.

The enterprise servers 124 may include a corporate web shopping cart access and reporting functions such as purchase reporting and postage dispense reporting. Similarly, the enterprise servers 124 may include payment functions such as check processing, POSTAGE BY PHONE available from Pitney Bowes Inc. of Stamford, Conn. and credit facilities. Moreover, the enterprise servers 124 may include subscription, billing, credit card processing and product management functions such as through a Customer Communications Management (CCM) system. The enterprise servers 124 may include distinct systems that are not related to postage such as systems providing user building access security.

Here, a Cloud data processing system 131 is described for providing for storing and processing data structures comprising structured tables that use a split primary key including a first key (partition key) and a second key (row key) along with a timestamp key, but that do not otherwise utilize uniform columns that could be used as a key. A Cloud computing instance executing on server 135 collocated in the same affinity group 131 of a related storage instance provides session control and manages database operations to ensure that only one thread is concurrently requesting database operations using a particular partition key. If the partition key is the user identifier, the computing instance will allow only one active session for that user by maintaining a system wide active user session log. The session log may be updated when a new session is granted access to identify the new session and may be updated to remove that session when the session terminates or times out. The session identifier may be the same identifier used as the partition key or may be an identifier having a unique one-to-one correspondence with the value used as the partition key.

The servers may be DELL POWEREDGE Servers and the client systems may include PCs such as DELL INSPIRON laptops or Dell OPTIPLEX desktops, each with associated displays, keyboards, mice, audio, video, processors, memory and disk storage subsystems. The Cloud devices may be MICROSOFT AZURE based. The clients may include smart phones, tablets, PDAs or other computing devices. The communications channels may be secured by VPN, HTTPS, SSL/TLS or other security system. The systems and subsystems here may be organized as different portions of an application, different applications on a computer or even different applications running on different computers. Similarly, any combination may be used or any known form of geographical, throughput or other load balancing may be used. The server logic may be written in JAVA, C++, C# or other system using a development environment such as VISUAL STUDIO.

Referring to FIG. 2, a schematic diagram representation of a data structure 200 according to an illustrative embodiment of the present application is described. The data structure 200 is provided using a structured table that uses a split "primary key" including a first key (partition key 210) and a second key (row key 220) along with a timestamp key 230, but that does not otherwise utilize uniform columns that could be used as a key. The data columns 240, 250, 260, 270 are not necessarily uniform in data type, content or even number of name, value pair elements per entity or row 211, 212, 219. Additionally, the table is not relational and the term primary key is used such that the combination of the partition key and row key must be unique in the table. However, ensuring a unique Row key across the table satisfies that constraint as does ensuring a unique row key across each of the individual partition keys.

The partition key 210 that is utilized is unusually fine in that it consists of an individual user identifier 211 (user 1 first instance), 212 (user 1, second instance), 219 (user 2 first instance). The user identifier is unique to the system and/or across multiple systems used in an enterprise. Similarly, an individual device identifier or combination of device identifier and user identifier may be utilized as a fine partition key. A user identifier may consist of a customer number and a device identifier may consist of an MAC address (e.g., ETHERNET) or other unique serial number. In such a way, a relatively large number of partitions are defined that reduce availability contention and locking contention in a database having a large number of concurrent users. In another example, a row key 220 that is unique across the database is used to provide a unique transaction identifier. Here, Row key instances 221, 222, 229 are unique across the table, but could be unique across each individual partition key.

The name, value pairs 241, 242, 249 for example, may hold similar data types across multiple entity or row types. In other cases, the name, value pairs 251, 252, 259 and 261, 262, 269 hold different data types across multiple entity or row types.

Figure 3:
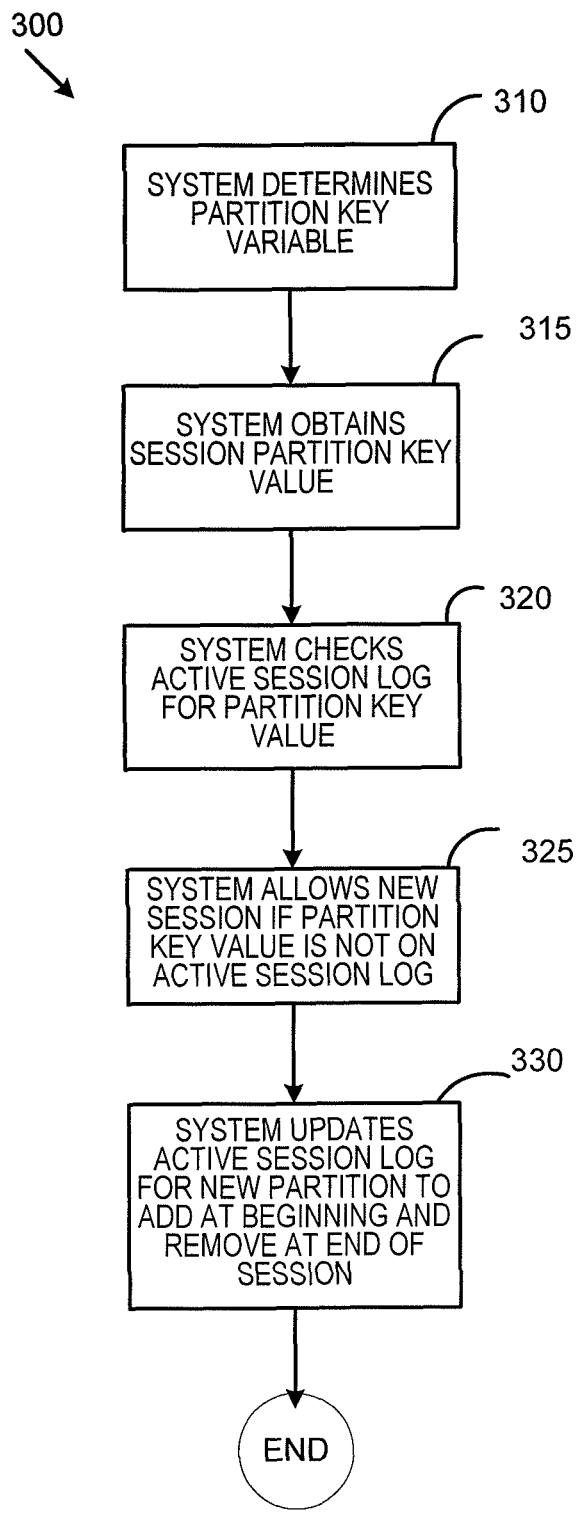
FIG. 3 is a flow chart showing a process for processing data using the data structure of FIG. 2 in the data processing system of FIG. 1.

Referring to FIG. 3, a flow chart showing a process 300 for processing data using the data structure of FIG. 2 in the data processing system of FIG. 1 is described. The process 300 may run on the Cloud Computing instance or may execute on the online postage system server. It could be run as part of the online postage web services or the cloud computing instance. Alternatively, the process described here may be run before allowing access to the online postage process. In step 310, the system determines the partition key that is used in a particular table that the system accesses. In step 315, the system obtains the session partition key value for a session that would like to be granted access to the system. In step 320, the system checks an active session log to determine of if that particular session already exists. The log may be stored on the online postal system server or in Cloud storage. In step 325, the system only allows the new session to proceed if the partition key value is not already on the active session log. In step 330, the system updates the active session log for new partition values to add at the beginning of the session and to remove it at the end of the session.

The present application describes illustrative embodiments of a data structure, a data processing system and a data processing method. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A non-transitory computer-readable storage medium accessible by a computer program system being executed on a data processing and storage system that has multiple concurrent users, comprising:
    a structured data table distributed across at least two nodes including a first node and a second node,
    the structured data table comprising at least two non-uniform rows, including at least a first row and a second row,
    each of the at least two non-uniform rows including a first key, a second key, and non-uniform columns including a plurality of name/value pair elements,
    wherein the first key comprises a partition key that is used in determining which of the at least two nodes stores each of the at least two non-uniform rows such that each of the at least two non-uniform rows having an identical partition key are stored in the same one of the at least two nodes,
    wherein the partition key consists of one of a plurality of unique identifiers associated with a respective one of the users, each of the unique identifiers corresponds one-to-one with a corresponding one of the users, and each of the user identifiers is globally unique for the corresponding user across the computer program system, and
    wherein the computer program system comprises a postage processing system and each of the users purchases postage using the computer program system, the data processing and storage system is a Cloud Computing system, at least two of the at least two non-uniform rows comprise a different number of columns, at least two of the at least two non-uniform rows comprise a column each having a different type of name/value pair, and the unique identifier associated with one of the users comprises a customer number.

2. The non-transitory computer-readable storage medium of claim 1, wherein the second key comprises a Row key, and wherein each Row key is globally unique for each of the at least two non-uniform rows.

3. The non-transitory computer-readable storage medium of claim 1, wherein the second key comprises a Row key, and wherein each Row key is locally unique for each of the at least two non-uniform rows that have the same partition key.

4. The non-transitory computer-readable storage medium of claim 1, wherein each of the unique identifiers corresponds one-to-one with a client computing device that is used to access the computer programming system by at least one of the users.

5. A method for controlling user session access to a computer program system being executed on a data processing and storage system that has multiple concurrent users and that has a structured data table distributed across at least two nodes including a first node and a second node, the structured data table comprising at least two non-uniform rows, including at least a first row and a second row, each of the at least two non-uniform rows including a first key, a second key, and non-uniform columns including a plurality of name/value pair elements, wherein the first key comprises a partition key that is used in determining which of the at least two nodes stores each of the at least two non-uniform rows such that each of the at least two non-uniform rows having an identical partition key are stored in the same one of the at least two nodes, and wherein the partition key consists of one of a plurality of unique identifiers associated with a respective one of the users, each of the unique identifiers corresponding one-to-one with a corresponding one of the users, and each of the user identifiers is globally unique for the corresponding user across the computer program system, the method comprising:
    obtaining a new session request from one user of the multiple concurrent users;
    determining the variable type of the partition key;
    obtaining a first value of the variable type from the one user;
    determining if the first value is listed on an active session log including a plurality of values of the variable type; and
    allowing the new session to start with access to the structured table after it is determined that the first value is not listed on the active session log, wherein the computer program system comprises a postage processing system and each of the users purchases postage using the computer program system, the data processing and storage system is a Cloud Computing system, at least two of the at least two non-uniform rows comprise a different number of columns, at least two of the at least two non-uniform rows comprise a column each having a different type of name/value pair, and the unique identifier associated with one of the users comprises a customer number.

6. The method of claim 5, further comprising the data processing system executing instructions comprising after allowing the new session to start after it is determined that the first value is not listed on the active session log, updating the active session log to include the first value.

7. The method of claim 5, further comprising:
    determining that the new session has ended or timed; and
    updating the active session log to remove the first value.

* * * * *